(12) United States Patent
Watanabe et al.

(10) Patent No.: US 7,221,983 B2
(45) Date of Patent: May 22, 2007

(54) PRODUCTION CELL

(75) Inventors: Atsushi Watanabe, Tokyo (JP); Hiroji Nishi, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 158 days.

(21) Appl. No.: 10/720,750

(22) Filed: Nov. 25, 2003

(65) Prior Publication Data
US 2004/0133310 A1    Jul. 8, 2004

(30) Foreign Application Priority Data
Dec. 2, 2002    (JP) .............................. 2002-350323

(51) Int. Cl.
*G05B 11/01* (2006.01)
*G06F 9/46* (2006.01)

(52) U.S. Cl. ..................... 700/11; 700/23; 718/104; 718/105

(58) Field of Classification Search ............... 700/11, 700/23, 19, 99, 101, 95; 718/104, 105; 705/8, 705/9, 11
See application file for complete search history.

(56) References Cited

U.S. PATENT DOCUMENTS

| | | | |
|---|---|---|---|
| 5,510,993 A | 4/1996 | Williams et al. | |
| 5,584,118 A | 12/1996 | Furukawa et al. | |
| 5,765,140 A * | 6/1998 | Knudson et al. | 705/9 |
| 5,893,074 A * | 4/1999 | Hughes et al. | 705/8 |
| 6,038,585 A * | 3/2000 | Togawa | 718/100 |
| 6,101,481 A * | 8/2000 | Miller | 705/9 |
| 6,148,290 A * | 11/2000 | Dan et al. | 705/1 |
| 6,308,164 B1 * | 10/2001 | Nummelin et al. | 705/9 |
| 6,347,253 B1 | 2/2002 | Fujita et al. | |
| 6,678,714 B1 * | 1/2004 | Olapurath et al. | 705/9 |

FOREIGN PATENT DOCUMENTS

| | | |
|---|---|---|
| EP | 09057576 | 8/1995 |
| EP | 0 977 101 | 7/1999 |
| JP | 60-057072 | 4/1985 |
| JP | 60-143281 | 7/1985 |
| JP | 3-255502 | 11/1991 |
| JP | 5-135065 | 6/1993 |
| JP | 10-058358 | 3/1998 |
| JP | 2000-099109 | 4/2000 |
| JP | 2000099111 A * | 4/2000 |

OTHER PUBLICATIONS

European Search Report for Application No. 03257491.5; dated Jun. 28, 2006.

* cited by examiner

*Primary Examiner*—Thomas K. Pham
(74) *Attorney, Agent, or Firm*—Staas & Halsey LLP

(57) ABSTRACT

An information processing device sends task unit indicator information for a set of task units having an assigned execution sequence to a robot control device and numerical control device which are work performing elements. A work performing element that can execute the first task unit sends back a notification for executability. The information processing device selects one of the work performing elements which has output a notification for executability, and issues an execution command to same. After execution, the task unit indicator information, from which the first task unit that has been executed is deleted, is returned to the information processing device. The information processing device then sends this task unit indicator information to all of the work performing elements. Thereafter, this processing is repeated until task units disappear in the task unit indicator information.

12 Claims, 7 Drawing Sheets

FIG. 4

(a) TASK UNIT INDICATOR INFORMATION

| NUMBER OF TASKS | TASK UNIT IDENTIFICATION INFORMATION | TASK UNIT IDENTIFICATION INFORMATION | — — — — — — — |
|---|---|---|---|
| a1 | a2 | a3 | |

(b) EXAMPLE OF TASK UNIT INDICATOR INFORMATION

| 5 | 1 | 2 | 3 | 4 | 5 |
|---|---|---|---|---|---|
| a1 | a2 | a3 | a4 | a5 | a6 |

(c) NOTIFICATION FOR EXECUTABILITY

| WORK PERFORMING ELEMENT IDENTIFICATION INFORMATION | TASK UNIT IDENTIFICATION INFORMATION | TASK EFFECIENCY |
|---|---|---|
| c1 | c2 | c3 |

(d) EXAMPLE OF NOTIFICATION FOR EXECUTABILITY

| 1 | 1 | 100 |
|---|---|---|
| c1 | c2 | c3 |

(e) EXECUTION COMMAND

| WORK PERFORMING ELEMENT IDENTIFICATION INFORMATION | TASK UNIT IDENTIFICATION INFORMATION |
|---|---|
| e1 | e2 |

(f) EXAMPLE OF EXECUTION COMMAND

| 1 | 1 |
|---|---|
| e1 | e2 |

EXAMPLE OF TASK UNIT INDICATOR INFORMATION WHEN FIRST TASK HAS BEEN COMPLETED

(g1)

| 4 | 2 | 3 | 4 | 5 |
|---|---|---|---|---|

(g2)

| 5 | 0 | 2 | 3 | 4 | 5 |
|---|---|---|---|---|---|

(g3)

| 6 | −1 | 1 | 2 | 3 | 4 | 5 |
|---|---|---|---|---|---|---|
| a1 | | a2 | a3 | a4 | a5 | a6 |

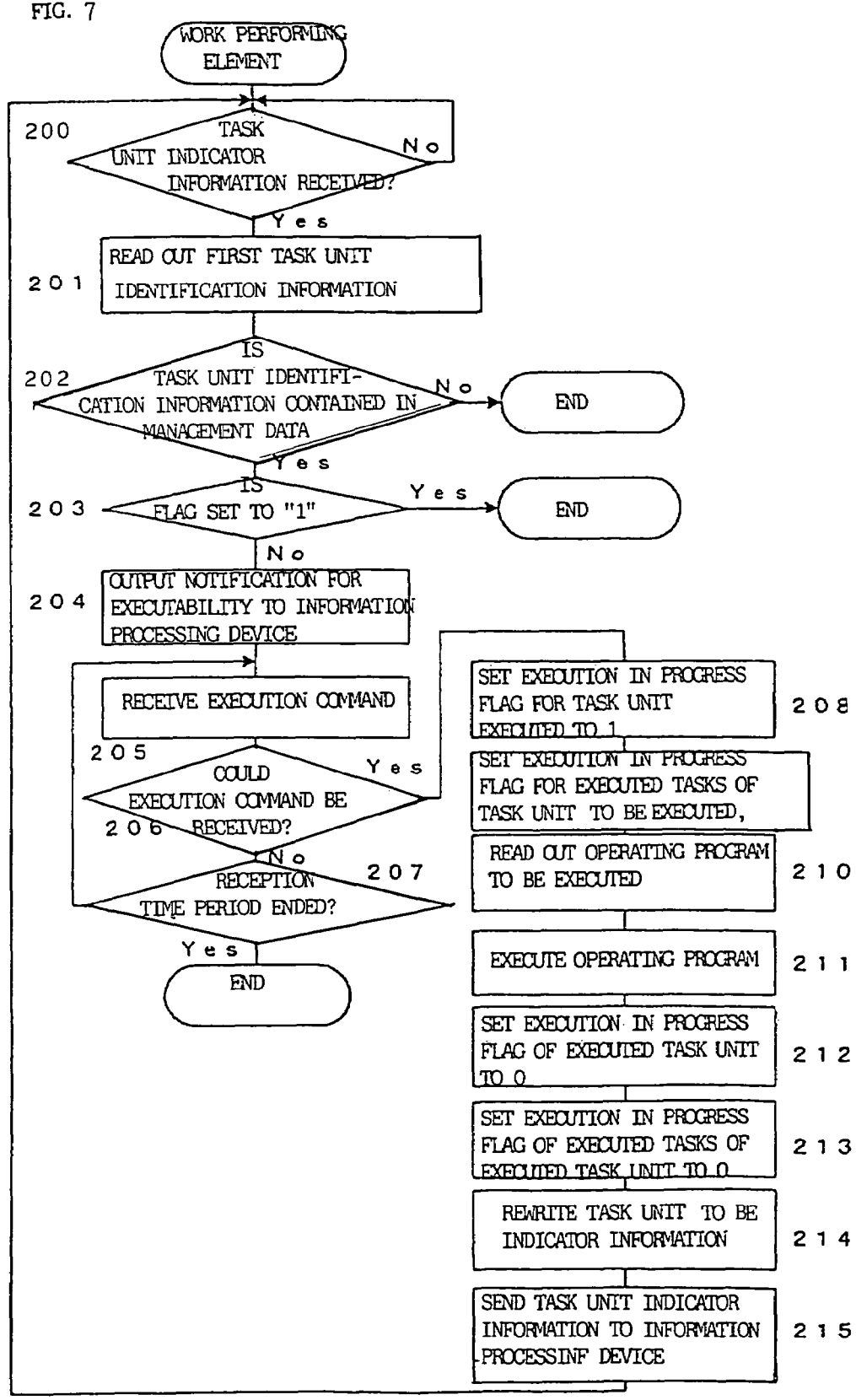

PRODUCTION CELL

BACKGROUND OF THE INVENTION

1. Field of the Invention

The present invention relates to a production cell having a plurality of work performing elements, such as a robot, processing machine, or the like.

2. Description of the Related Art

In a production system for machine parts, or the like, a sequence of work tasks is carried out automatically, whereby a workpiece is received, processed, and then passed on to the next process. A production cell forming a production system that is highly automated is based on the operation of work performing elements which actually carry out the production tasks, such as a plurality of industrial robots or processing machines, or the like. The industrial robots and processing machines each have a work program, and operate individually, and they are connected mutually by communications means, such as I/O units, or the like.

When designing a production system, the production steps in each production cell are planned, the production tasks in each production step are planned, the work performing elements, such as industrial robots, processing machines, and the like, required for each production task in each step are planned, and work tasks are planned to be carried out by the individual work performing elements, such as the industrial robots, processing machines, and the like. In other words, the production work required by the production cell is achieved by dividing it up into individual production tasks for the work performing elements, such as industrial robots, processing machines, and the like, which are the constituent elements of the production cell.

A cell controller which controls the production cell indicates, via the I/O units, or other such communications means, when a work performing element, such as a robot, machine, or the like, should execute its allocated task. For example, the behaviour of a cell controller in one of a plurality of production cells performing machine processing will be considered. A robot receives a workpiece processed in an upstream cell, by means of a temporary workpiece stand, or a conveyance device. It grasps the workpiece, installs it on a processing machine, and then waits until processing has completed. When the processing by the machine has been completed, the workpiece is removed from the processing machine and is conveyed by means of a temporary workpiece stand or a conveyance device, to a downstream production cell. The cell controller controls this production step, and the cell controller performs the operations of: receiving an indication that the preparation of the workpiece from the upstream cell has been completed, by means of an input signal, notifying the processing machine to prepare for processing, by means of an output signal, receiving a processing preparation completed signal from the processing machine by means of an input signal, requesting the robot to grasp the workpiece from the upstream step and install it in the processing machine, by means of an output signal, receiving an indication that the workpiece has been installed in the processing machine from the robot, by means of an input signal, outputting a processing start instruction to the processing machine by means of an output signal, receiving a processing completed signal from the processing machine, and instructing the robot to remove the workpiece from the processing machine and supply it on to the downstream step, and when the cell controller is notified by the robot that the supply of the workpiece to the downstream step has been completed, then it waits until another workpiece is supplied from the upstream process.

In the work program of the robot, firstly, the robot waits until it receives a signal from the cell controller indicating the arrival of a workpiece from the upstream cell, and it then performs the tasks of grasping the workpiece, conveying the workpiece to the processing machine, and installing the workpiece in the processing machine, whereupon it outputs a task completed signal to the cell controller. Thereupon, the robot waits for the cell controller to send a request for the workpiece to be removed from the processing machine, upon which it performs the task of removing the workpiece, and then the task of supplying the workpiece to the downstream cell.

The foregoing operation of a production cell refers to the most simple example, involving a single processing machine and a single robot, and the production work comprises a single predetermined sequence, starting with the arrival of a workpiece from the upstream cell, and ending with the output of the workpiece to the downstream cell. In general, since the processing machine takes a long time to process the workpiece, the production capacity of the production cell is determined by the capacity of the processing machine. If the capacity of the production cell is insufficient, then the number of processing machines is raised to two, and a composition comprising a single robot and two processing machines is adopted. In this case, the program for the robot and the program for the cell controller are much more complicated than in the case of a single processing machine and single robot scenario. The cell controller monitors three states: the arrival of a workpiece from the upstream cell, the completion of processing by processing machine 1 and the completion of processing by processing machine 2. When a workpiece arrives from the upstream cell, it is investigated which of the processing machines 1 and 2 is not in use, and the work is installed in the machine that is not currently processing. In this case, it is also necessary to recognize situations where both of the processing machines are in use and the workpiece cannot be installed, and temporary stands must be provided, for example, for each of the processing machines. The robot program also becomes complicated, and must simultaneously monitor four signals: a request to install a workpiece on processing machine 1, a request to install a workpiece on processing machine 2, a processing complete signal from the processing machine 1 and a processing complete signal from processing machine 2, and it must change the contents of its work in accordance with the signal that arises.

What would be the situation if the number of processing machines in the production cell were raised to three? In this case, the processing capacity provided by the three machines may outstrip the capacity of the robot to install and remove workpieces. If this is the case, then the number of robots is increased, and the production cell will be constituted by three processing machines and two robots. When a workpiece arrives from the upstream cell, the cell controller must identify a robot that is not in use and a processing machine that is not in use, and it must then issue operating commands to this robot and processing machine. If a processing complete signal arrives from any one of the processing machines, it must identify a robot that is not in use and command it to remove the workpiece. In this way, the more complex the work operations in the production cell become, the greater the burden on the cell controller, and if the composition of the production cell is to be changed, or if the workpieces for machine components, or the like, that are to be processed by the production cell are changed, then it becomes very difficult to plan production.

Conventionally, when carrying out processing in a production cell of this kind, programs for controlling the operation of the robots and processing machines are stored respectively as sequential programs in such a manner that the work tasks are executed from the start of production until the end. Therefore, if the type of product that is to be produced is changed, or the like, then the whole program must be revised. However, in order to be able to adapt readily to a change in the type of product, or the like, Japanese Patent Application Laid-open No. 9-57576 discloses a method wherein tasks of a plurality of different types are executed sequentially and the production plan can be changed easily, by adapting a numerical control device for controlling the processing machines to each type of workpiece and each type of work task, storing a plurality of processing programs containing system constants relating to each type of workpiece and each type of work task, and supplying a processing program and the established values for the system constants to the numerical control device, from a cell controller.

Even in the case of a relatively simple production cell using processing machines and robots of this kind, the cell controller for controlling same, and the programs for the robots and processing machines forming the work performing elements, become very complicated. In this method, the cell controller and the work programs for the robots describe a sequence of production operations from start to finish, these programs being stored in storage devices of the cell controller or robots, and being read out from same and executed, and therefore it is not possible to combine them freely when executing individual work tasks on their own. In Japanese Patent Application Laid-open No. 9-57576 mentioned above, a processing program is prepared for each type of product to be processed, and by selecting a processing program, a particular sequence of production tasks is executed, but it is not possible freely to combine and execute individual task units.

In particular, if the constituent elements of the processing cell change, or if the production steps change, then it is necessary to cause the constituent elements of the system to operate according to a different procedure, and hence the program of the cell controller must be rewritten accordingly. In accordance with the changes made to the program of the cell controller, new programs must also be prepared for the robots and processing machines. Therefore, if the number of processing machines or robots is increased or decreased, or new processing steps are added, from the viewpoint of the production capacity of the cell, then it will be necessary to change the programs of all the constituent elements of the system.

Moreover, the constituent elements of the system operate on the basis of input and output communications using digital signals. Supposing that the output signal 1 from the cell controller is a request to robot 1 to convey a workpiece from an upstream cell, then this is taken to be connected to the input signal 1 of the robot 1. If the output signal 2 of the cell controller is a request to robot 2 to convey a workpiece, then this is taken to be connected to the input signal 2 of the robot 2. In this way, with regard to such digital signals, it is necessary to manage the correspondences between the meaning of the signals and the signal numbers, for each one of the respective constituent elements. Therefore, each time the number of elements is increased, or the processing step is changed, new signals are required, and on each occasion, the correspondences between signal numbers and meanings must be reviewed. Therefore, in many cases, the signal meanings and signal numbers are defined incorrectly at the stage of rewriting the programs for the cell controller, the robots and the processing machines. Furthermore, even if a workpiece conveyance processing program created for robot 1 is to be reused for robot 2, for example, since the correspondence between signal numbers and meanings is different for each robot, the program cannot be reused without modification.

Moreover, only the cell controller is able to issue work commands to the robots and processing machines, and the cell controller is not able to issue these work commands unless it follows a previously determined procedure. Therefore, it is not possible, for instance, to execute only a portion of the processing step. Furthermore, if many different types of product are to be manufactured, then previously determined procedural programs are prepared for each type of product, and it is not possible to carry out manufacture of plural types of products, in a parallel fashion.

SUMMARY OF THE INVENTION

The production cell according to the present invention comprises a plurality of work performing elements for performing work, and an information processing device for commanding work tasks, connected to the respective work performing elements by communications means.

In a first aspect of a production cell according to the present invention, the information processing device outputs a command consisting of a set of task units assigned with an execution sequence, to each of the work performing elements; and the work performing elements each store operating programs for respectively executing one or more task units, and perform work by executing the operating programs in the order of the execution sequence, on the basis of the set of task units with an assigned execution sequence output by the information processing device.

This first aspect of the production may adopt the following modes.

The management of the task unit to be executed next is performed by the information processing device, each time the work in one task unit is completed.

The management of the task unit to be executed next is performed by communications between the work performing elements, each time the work in one task unit is completed.

Two or more work performing elements capable of performing the work of the same task unit are provided, and the work performing element to carry out the work of the same task unit is determined by the information processing device.

Two or more work performing elements capable of performing the work of the same task unit are provided, and the work performing element to carry out the work of the same task unit is determined by communications between the work performing elements, in accordance with a previously determined priority order.

In a second aspect of the production cell according to the present invention, the information processing device comprises: means for storing task unit indicator information describing the execution sequence of task units required in order to accomplish the work in question, for each type of work command to be executed in the production cell; means for receiving a work command and reading out the task unit indicator information corresponding to the received work command, from the storing means; means for receiving notifications for executability from the respective work performing elements, and sending an execution command to one of the work performing elements having sent the notifications for executability thus received; means for receiving task unit indicator information updated and sent back by a work performing element; and means for sending the task unit indicator information read out from the storing means, and the updated task unit indicator information sent back from the work performing element, to each of the work performing elements. Moreover, each of the work performing elements comprises: task unit storing means for storing one or more task units; means for receiving task unit indicator information from the information processing device and determining whether or not it is possible to execute the task unit that is to be executed next, on the basis of the task unit indicator information; means for sending the notification for executability to the information processing device if the task unit is determined to be executable; means for receiving an execution command from the information processing device and executing the instructed task unit; and means for updating the task unit indicator information and sending same to the information processing device, when execution of the task unit has been completed, such that it can be determined that the task unit has been completed on the basis of the received task unit indicator information.

In a third aspect of a production cell according to the present invention, the information processing device comprises: means for storing task unit indicator information describing the execution sequence of task units required in order to accomplish the work in question, for each type of work command to be executed in the production cell; means for receiving a work command and reading out the task unit indicator information corresponding to the received work command, from the storing means; means for successively outputting information relating to an execution unit to be executed, to each of the work performing elements, on the basis of the execution sequence in the task unit indicator information read out, directly after the task unit indicator information has been read out and each time an execution completion notification is received; and means for receiving notifications for executability from the respective work performing elements, and sending an execution command to one of the work performing elements having sent the notifications for executability thus received. Furthermore, each of the work performing elements comprises: task unit storing means for storing one or more task units; means for receiving execution unit information from the information processing device and determining whether or not it is possible to execute the task unit of the information in the execution unit; means for sending the notification for executability to the information processing device if the task unit is determined to be executable; means for receiving an execution command from the information processing device and executing the instructed task unit; and means for sending an execution completion notification to the information processing device when the execution of the task unit has been completed.

In the second and third aspects of the production cell described above, the means for determining whether a task unit is executable determines whether or not it is possible to execute the task unit on the basis of the task units that can be executed by the work performing element in question, and management data storing whether or not the work in the task unit can be started.

In the first to third aspects of the production cell described above, it is also possible to enable a new work command to be received and work tasks corresponding to the new work command to be executed, while executing work tasks corresponding to another work command already received. Furthermore, the types of the work commands may be determined by the types of workpiece that are to be processed.

According to the present invention, the aforementioned problems are resolved, and it becomes possible to change the task units in the production cell, and hence a production cell can be provided in which the composition of the production cell and the type of products produced by same can be changed readily.

BRIEF DESCRIPTION OF THE DRAWINGS

The aforementioned and other objectives and features of the present invention shall become apparent from the following description of the embodiments made with reference to the accompanying drawings, in which:

FIG. 4 is an illustrative diagram showing the data structure of information exchanged between an information processing device and a work performing element in this embodiment;

FIG. 7 is a flowchart of processing executed by a work performing element in this embodiment.

DESCRIPTION OF THE PREFERRED EMBODIMENTS

Figure 1:
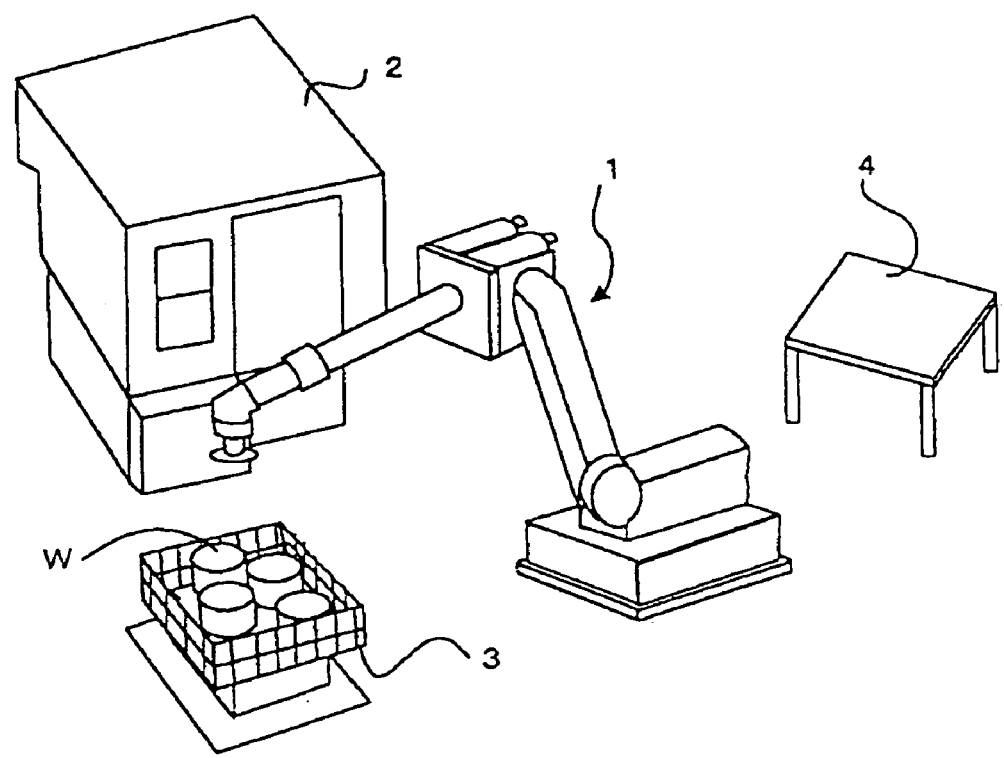
FIG. 1 is a general view of one embodiment of the present invention.

FIG. 1 is a general view of a production cell according to one embodiment of the present invention, wherein the work performing elements forming the production cell comprise a robot and a machine tool. Numeral 1 denotes the robot and numeral 2 denotes the machine tool. The work in this production cell involves the robot 1 grasping a workpiece W from a workpiece stocker 3, and installing it in the machine tool 2. When the machine tool 2 has finished processing the workpiece W, the robot 1 removes the workpiece W from the machine tool 2, and loads the processed workpiece W onto a temporary stand 4. In the work conducted in the production cell, identification information for identifying the work performing element is assigned to the work performing elements that actually carry out the tasks. In this embodiment, the work performing elements are the robot 1 and the machine tool 2. Work performing element identification information is previously assigned to the robot 1 and the machine tool 2 as indicated below, for example.

| Work performing element | Identification information |
|---|---|
| Robot | 1 |
| Machine tool | 2 |

Figure 2:
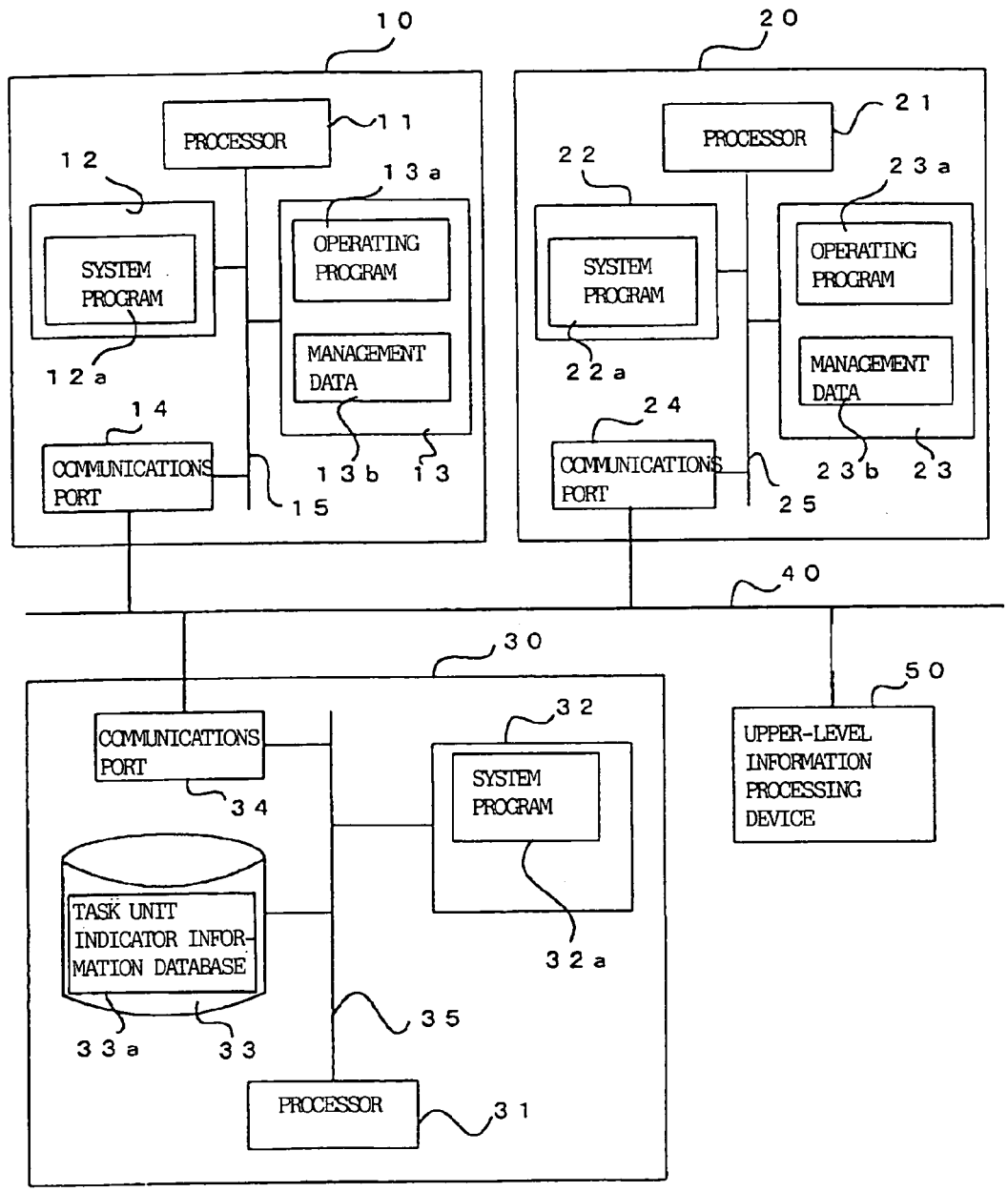
FIG. 2 is a block diagram of a control system according to this embodiment.

FIG. 2 is a block diagram of a control system according to the present embodiment.

Numeral 10 denotes a robot control device for controlling the robot 1, and numeral 20 denotes a numerical control device for controlling the machine tool 2. Furthermore, numeral 30 denotes an information processing device. The robot control device 10, the numerical control device 20, and the information processing device 30 are interconnected via communications means 40. Moreover, an upper-level information processing device 50 is also connected to the communications means 40.

The robot control device 10 comprises a processor 11, and a system memory 12, program memory 13 and a communications port 14 connected via a bus 15 to the processor 11. A system program 12a is stored in the system memory 12, and an operating program 13a and management data 13b for each task unit and stored in the program memory 13, as described hereinafter.

In a similar fashion, the numerical control device 20 comprises a processor 21, and a system memory 22 for storing a system program 22a, a program memory 23 for storing operating programs 23a and management data 23b for each task unit, and a communications port 24, respectively connected to the processor 21 by means of a bus 25.

The information processing device 30 comprises a processor 31, and a system memory 32 for storing a system program 32a, and a storage device 33 for storing a task unit indicator information database, respectively connected to the processor 31 by means of a bus 35.

The program memories 13, 23 of the control devices 10, 20 of the robot 1 and machine tool 2, which are the work performing elements, store programs 13a, 23a, for each task unit, which cause the work of each task unit to be carried out and are obtained by dividing the work carried out by the respective work performing elements into prescribed task units. Moreover, the management data 13b, 23b contains data for managing the operations of the respective work performing elements (the machine tool and the robot).

Furthermore, the work performed in the production cell is divided into work task units, and identification information is assigned to each task unit. The production cell according to the present embodiment is taken to have a total of five task units. These task units are previously assigned identification information for identifying each respective unit. In the present embodiment, the task units and corresponding identification information are determined as indicated below.

| Task unit | Identification information |
|---|---|
| Grasp and lift workpiece from workpiece stack | 1 |
| Install workpiece in machine tool | 2 |
| Process workpiece | 3 |
| Remove workpiece from machine tool | 4 |
| Place workpiece on temporary workpiece stand | 5 |

Figure 3:
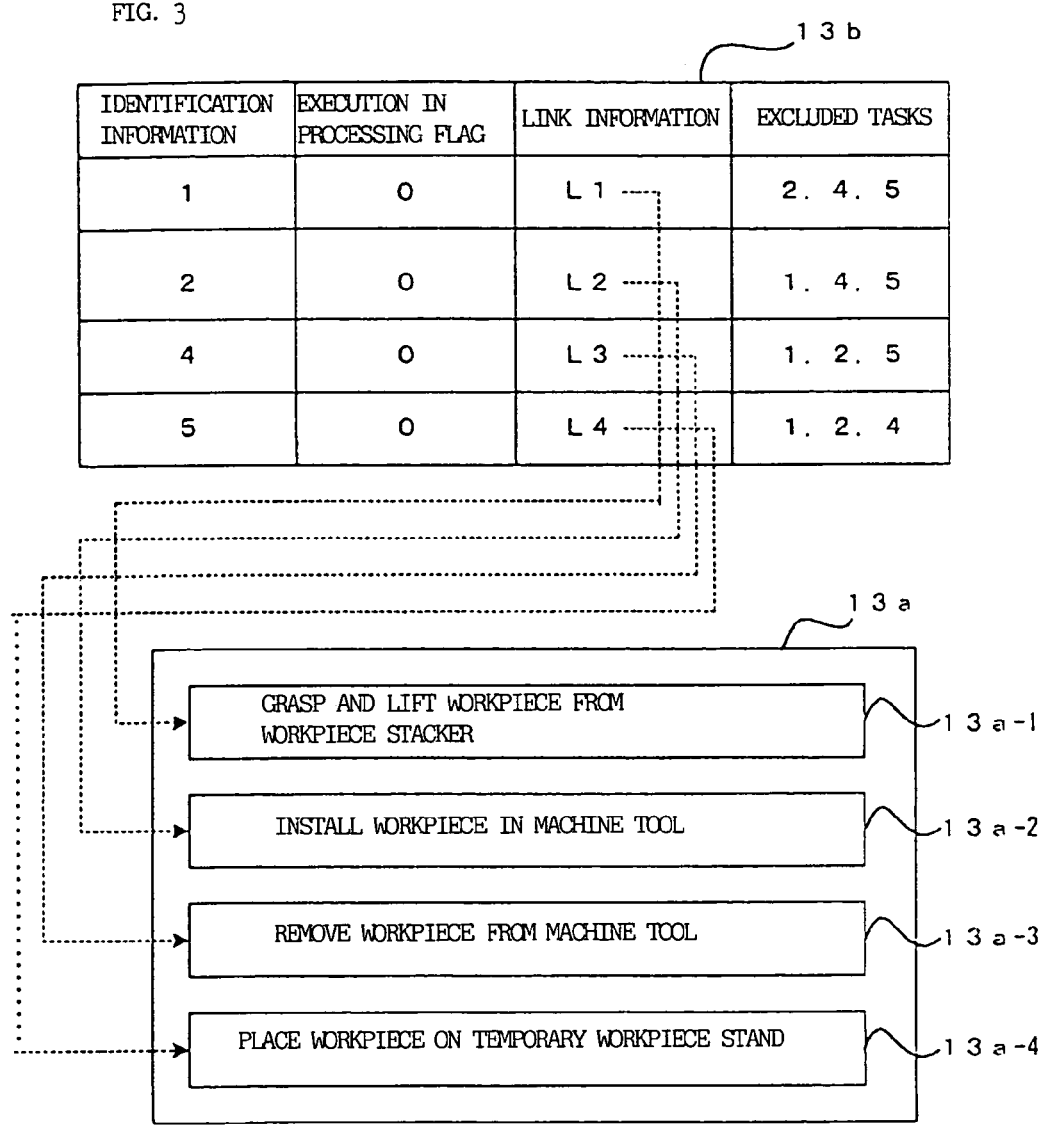
FIG. 3 is an illustrative diagram for describing the relationship between management data and operating programs in this embodiment.

FIG. 3 is an illustrative diagram showing the relationship between the management data and operating program, and it depicts an example of management data 13b and an operating program 13a which are stored in the program memory 13 of the robot control device 10. The tasks performed by the robot 1 are four of the tasks in the task units described above, and a robot operating program 13a-1 for the task "Grasp and lift workpiece from workpiece stack" having identification information "1", a robot operating program 13a-2 for the task "Install workpiece in machine tool" having identification information "2", a robot operating program 13a-3 for the task "Remove workpiece from machine tool" having identification information "4", and a robot operating program 13a-4 for the task "Place workpiece on temporary workpiece stand" having identification information "5", are all stored previously in the program memory 13.

In the management data 13b which manages the operating programs 13a-1 to 13a-4 for each task unit and manages the operation of the robot, there is previously prepared, for each of the respective operating programs 13a-1 to 13a-4, identification information corresponding to the task units of each of the respective operating programs 13a-1 to 13a-4, execution in progress flags for indicating that each of the operating programs 13a-1 to 13a-4 is being executed or that it cannot be executed, link information for specifying one of the operating programs 13a-1 to 13a-4, and excluded tasks for indicating tasks which cannot be started until this task is completed.

Similar operating programs 23a and management data 23b for managing same are stored previously in the program memory 23 of the numerical control device 20 which controls the machine tool 2. However, in the case of the present embodiment, the work of the task units carried out by the machine tool only comprises the processing program of the machine tool relating to the "Process workpiece" task unit having identification information "3" and the management data 23b only comprises management data for managing this operating (processing) program. However, if there were a plurality of types of workpiece W, or if there were various processing methods, then a processing (operating) program for the machine tool would be stored in the program memory for each respective processing task, and respective management data for each would be provided in the management data 23b.

Task unit indicator information relating to various work commands is stored in the storage device 33 of the information processing device 30, in the form of a database 33a. A work command instructs a sequence of work tasks which vary depending on the type of workpiece and the processing method used, and the like, and the combination of task units which make up this sequence of work tasks can vary. The task unit indicator information is stored as a database in the storage device 33, in the form of a set of task units having an assigned order of combination corresponding to the respective work command.

FIG. 4(*a*) is an illustrative diagram showing the data structure of this task unit indicator information. The task unit indicator information is constituted by a number of tasks a1, and one or more items of task unit identification information a2, a3, a4, . . . . The number of tasks a1 is a number which indicates how many items of task unit identification information there are. The task unit indicator information contains the identification information assigned to the respective tasks units, arranged in the order in which those tasks are performed. FIG. 4(*b*) shows the task unit indicator information stored in the task unit indicator information database 33a for the work commands in the production cell in the present embodiment. In other words, as described above, since the work carried out in the production cell of the present embodiment is constituted by the task units having identification information 1 to 5, then the number of tasks is "5", and the order of implementation of the task units is 1, 2, 3, 4, 5, thus yielding the task unit indicator information illustrated in FIG. 4(*b*).

Next, the operation according to the present embodiment will be described.

When a workpiece W is supplied to the workpiece stacker 3 from the upstream production cell, and a work command is input to the information processing device 30 of the production cell in question, from the upper-level information processing device via the communications means 40, then the processor 31 of the information processing device 30 searches the task unit indicator information database 33a for the task unit indicator information corresponding to this work command. The task unit indicator information thus located (see FIGS. 4(a), (b)) is sent via the communications port 34 and the communications means 40 to all of the work performing elements of the production cell. In the present embodiment, the task unit indicator information as illustrated in FIG. 4(b) is sent to the control devices 10 and 20 of the robot 1 and the machine tool 2 via the communications ports 14 and 24.

The processors 11, 21 of the control devices 10, 20 of the work performing elements (the robot 1 and the machine tool) read out the task unit identification information a2 following the number of tasks a1 in the task unit indicator information thus received, and search for identification information registered in the management data 13b, 23b which matches the task unit identification information a2 thus read out. If there is matching information, then the execution in progress flag which is the item following the management data 13b, 23b is checked to investigate whether or not that task unit is already being executed. If the task unit is not being executed, then a notification for executability as illustrated in FIGS. 4(c), (d) indicating that the first task indicated by the task unit indicator information can be executed, is sent to the information processing device 30, via the communications ports 14, 24, communications means 40, and communications port 34.

FIG. 4(c) is an illustrative diagram showing the data structure of the notification for executability. This notification for executability is constituted by source work performing element identification information c1 that states which of the work performing elements has output this notification for executability, task unit identification information c2 indicating the executable task unit, and information c3 indicating the task efficiency of that task unit. This task efficiency indicates, for example, if the task unit is a conveyance task for the robot, approximately how much time it will take to complete that conveyance task. Furthermore, if the task unit is a processing task for the machine tool, then it indicates approximately how much time it will take to complete that processing task. Moreover, if there are a plurality of robots and machine tools in the production cell, then if a notification for executability is returned to the information processing device by a plurality of work performing elements, the information processing device can use the task efficiency to determine which of the work performing elements should be caused to implement the task. Even in the case of the same conveyance task, the conveyance time will differ depending on the installation position of the robot, and therefore greater efficiency will be achieved if the information processing device requests the robot having the shortest conveyance time to perform the task. Moreover, in the case of a machine tool, or the like, this task efficiency c3 can also be used to indicate total working time, in other words, the degree of fatigue of the machine, or the like, rather than just the processing efficiency, in order that the processing tasks are distributed evenly. If the task efficiencies c3 are the same, then the information processing device issues the task implementation command to the device to which the notification for executability is sent back first. However, this task efficiency c3 is only effective in cases where there are a plurality of work performing elements, and it is possible to restrict its use to such cases only. If the number of work performing elements is small, then a structure for the notification for executability which excludes this task efficiency information c3 can be used. Alternatively, it is possible to establish a priority order.

FIG. 4(d) shows an example of a notification for executability sent by the robot control device 10 in the present embodiment. In this case, the first task unit identification information instructed by the information processing device 30 is "1" "Grasp and lift workpiece from workpiece stacker", and the work performing element which can carry out this task unit is the robot, and the identification information thereof is "1". The task unit of identification information "1" is registered in the management data 13b, and since it is executable, work performing element identification information=1 and task unit identification information=1 are sent. Moreover, "100" is sent as the task efficiency. In this "100", taking the highest efficiency as 100%, if there is another work performing element capable of performing the same task unit, then the task efficiency figure is set to the percentage efficiency achieved in comparison to this highest efficiency, when the other work performing element is used. In the present embodiment, there is no other work performing element apart from the robot 1 that is able to perform the same work element, and therefore the task efficiency is set to "100".

The task unit indicator information shown in FIG. 4(b) is sent to the numerical control device 20, but since the identification information "1" of the task unit identification information a2 stored after the number of tasks a1 in the task unit indicator information is not registered in the management data 23b of the numerical control device 20, then the processor 21 of the numerical control device 20 does not output a notification for executability as illustrated in FIG. 4(c).

The information processing device 30 sends the task unit indicator information (see FIG. 4(a), (b)) to all of the work performing elements (the robot 1 and machine tool 2), whereupon it waits during a prescribed period of time for a notification for executability (see FIG. 4(c), (d)) to be returned. If more than one notification for executability is returned, then one of the work performing elements is determined on the basis of the contents of the work efficiency (see item c3 in FIG. 4(c)), or on the basis of the order in which the notifications were returned, and an execution command as illustrated in FIG. 4(e) is issued to that work performing element. The execution command contains work performing element identification information e1 and task unit identification information e2. FIG. 4(f) shows an execution command sent by the information processing device 30 to the robot control device 10 in the case of the present embodiment. In other words, an execution command indicating the task "Grasp and lift workpiece from workpiece stacker" having task unit identification information of "1" to the robot 1 having work performing element identification information of "1", is sent to the robot control device 10.

The work performing element (robot control device 10) receiving the execution command illustrated in FIGS. 4(e) and (f) sets the execution in progress flag, corresponding to the task unit being executed in the management data (13b), from "0" to "1". Thereupon, the excluded tasks are read out, and the execution in progress flags in the identification information given for these tasks are simultaneously set to "1". This is because in many cases, when the execution of one task unit has started, it is not possible to carry out another task unit. For example, in the present embodiment, if the robot 1 is being caused to execute the task 13a-1 "Grasp and lift workpiece from workpiece stacker" having task unit identification information of "1", then it becomes impossible to execute the tasks 13a-2, 13a-3, 13a-4 corresponding to the other identification information 2, 4, 5, and hence all of the execution in progress flags are set to "1" in order to prevent these tasks 13a-2, 13a-3, 13a-4 from being executed. In the present embodiment, if the robot 1 has started to perform one task unit, then none of the other task units can be performed. However, if, for example, the robot control device 10 comprises a visual sensor, then provided that the robot control device 10 has a task unit for identifying objects by means of the visual sensor, it is possible to carry out a task unit involving this visual sensor while any of the tasks 13a-1 to 13a-4 is being executed. Moreover, if the robot control device 10 also controls the conveyor, which can be operated independently from the robot 1, then a task unit for moving the conveyor can be carried out while the robot 1 is performing any of the tasks 13a-1 to 13a-4.

After the execution in progress flags in the management data have been changed from "0" to "1", then the work performing element reads out one of the operating programs on the basis of the link information, and carries out the corresponding task. In the present embodiment, the robot control device reads out the task unit program 13a-1 and executes same, on the basis of the link information corresponding to the identification information "1" of the task unit.

When the task has been completed, the work performing element changes the execution in progress flag for the task unit that has been completed, and for the task units indicated as excluded tasks, from "1" to "0".

A notification that the task has been completed is sent to the information processing device 30, and in the present embodiment, the task unit indicator information (see FIGS. 4(a), (b)) received previously from the information processing device 30 is processed and sent back to the information processing device 30 so that it can identify the task that has been completed. Various methods can be used for processing the task unit indicator information in such a manner that that the completed task can be identified.

Here, FIGS. 4(g1) to (g3) illustrate the method for indicating that the work of the task unit having task unit identification information a2=1 has been completed (execution of operating program 13a-1 has terminated) in response to the task unit indicator information shown in FIG. 4(b).

In FIG. 4(g1), the information "5" indicating the number of tasks a1 in the task unit indicator information shown in FIG. 4(b) has been changed to "4", the task unit identification information a2 for the completed task unit has been deleted, and the items of task unit identification information a3 to a6 have each been shifted one position to the left. In FIG. 4(g2), the task unit identification information has been rewritten as "0", in order to indicate identification information for a completed task, and hence the task unit identification information a2 has been changed from 1 to 0. In FIG. 4(g3), the information "−1" has been appended in front of the task unit identification information for the completed task, and thus it is indicated that the task unit identification information following the "−1" relates to a task that has been completed. In the example in FIG. 4 (g3), "−1" is inserted before the task unit identification information a2, and the information indicating the number of tasks a1 is changed from "5" to "6". Other methods besides these may be conceived for indicating a completed task, but in the present embodiment, the method for indicating completed tasks as illustrated in FIG. 4(g1) is adopted.

Upon receiving the task unit indicator information in FIG. 4(g1), the information processing device 30 confirms whether or not all of the task units have been completed, and if there is a task unit that has not been completed, then it sends the received task unit indicator information (FIG. 4(g1)) to all of the work performing elements (the robot control device 10 and numerical control device 20). By repeating this procedure until there remains no uncompleted task unit in the task unit indicator information, the production cell is caused to execute the instructed work commands. If the work in all of the task units has been completed, then the information processing device 30 sends a completion notification to the upper-level information processing device 50.

Figure 5:
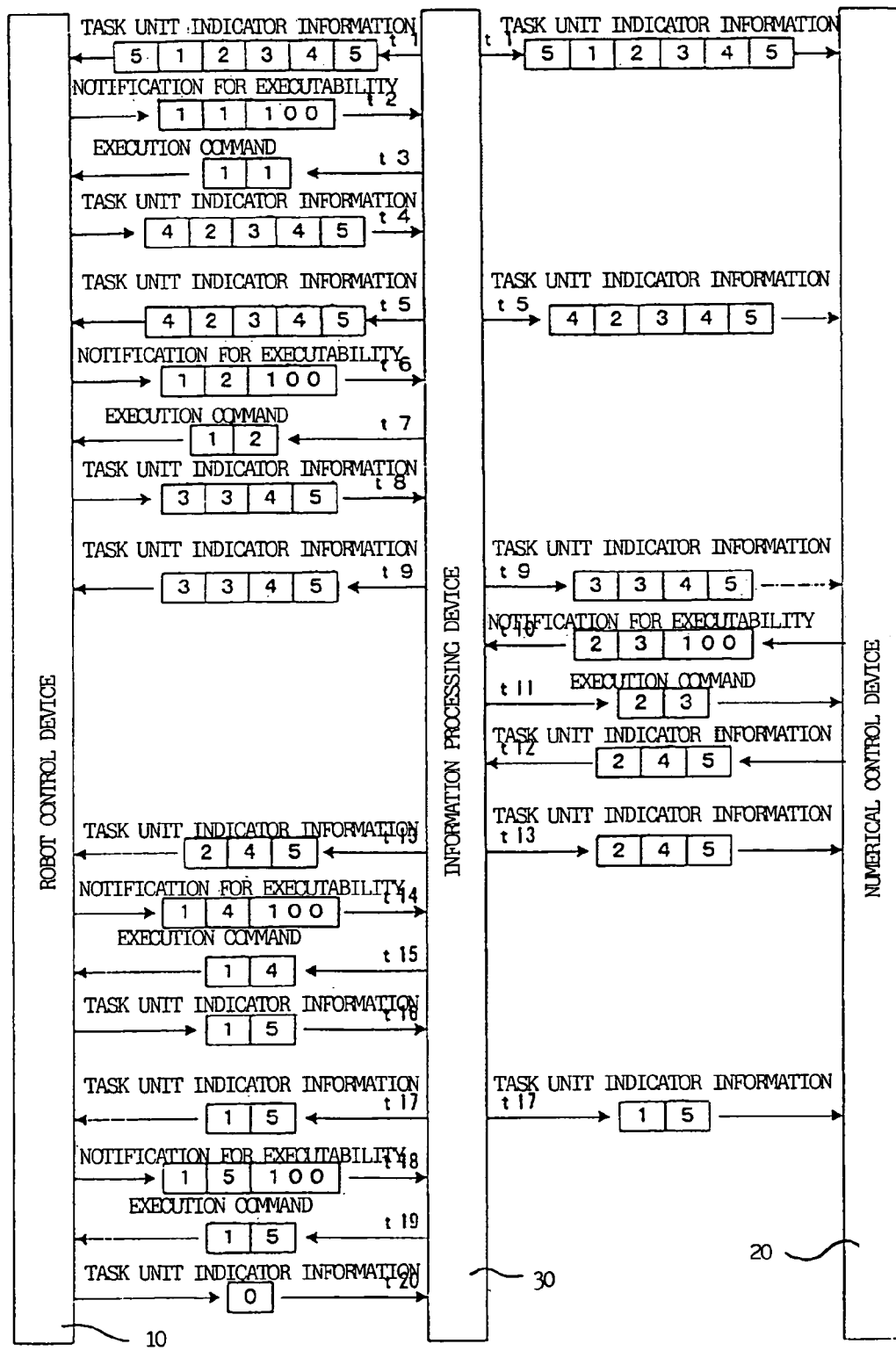
FIG. 5 is an illustrative diagram showing the mode of communications between an information processing device, a robot control device, and a numerical control device.

FIG. 5 shows the mode of communications between the information processing device 30 and the robot control device 10 and the numerical control device 20 in the present embodiment, from the time the information processing device 30 receives a work command until the time the initial task unit indicator information as illustrated in FIG. 4(b) is sent and all of the tasks is completed. The time flow advances from top to bottom in FIG. 5.

When a work command is input to the information processing device 30 from the upper-level information processing device 50, via the communications means 40, the processor 31 of the information processing device 30 searches for task unit indicator information corresponding to that work command from the task unit indicator information database, and the task unit indicator information corresponding to that work command ("5, 1, 2, 3, 4, 5", as seen in FIG. 4(b)) is output to all of the work performing elements, namely, the control device 10 of the robot 1 and the numerical control device 20 which controls the machine tool 2 (time t1).

The respective work performing elements determine whether or not the first task unit identification information stored in the task unit indicator information thus received is contained in the task unit identification information stored in the management data (13b, 23b). If this task unit identification information is present in the management data (13b, 23b), then it is determined whether or not the flag is set to "0" so that the task is executable. In the present embodiment, the first stored task unit identification information "1" is registered in the management data 13b of the robot control device 10, and therefore the robot control device 10 sends a notification for executability ("1, 1, 100", see FIG. 4(d)) comprising source work performing element identification information, the task unit identification information which has determined that the task unit can be executed, and a task efficiency value, to the information processing device 30 (time t2). Since the first stored task unit identification information "1" is not registered in the management data 23b of the numerical control device 20, no response is output by the numerical control device 20.

The information processing device 30 receives the notification for executability ("1, 1, 100") and selects the work performing element to carry out the task on the basis of the task efficiency information c3, but in the present embodiment, a notification for executability is sent only by the robot control device 10, and therefore an execution command "1, 1" comprising the identification information "1" of the robot 1 which is to be the work performing element, and the identification information "1" of the operating program of the task unit to be performed, as illustrated in FIG. 4(f), is output to the robot control device 10 (time t3).

The robot control device 10 receives this execution command, reads out and executes the operating programs 13a-1 corresponding to the task unit identification information "1", and the robot 1 thus performs the task of "Grasp and lift workpiece from workpiece stacker". Thereupon, the number of tasks a1 in the task unit indicator information previously received is reduced by 1, the initial task unit identification information "1" corresponding to the task that has been carried out is deleted, and the task unit indicator information "4, 2, 3, 4, 5" is sent back to the information processing device 30 (time t4).

The information processing device 30 sends the task unit indicator information "4, 2, 3, 4, 5" thus received to the control devices 10, 20 of all of the work performing elements (the robot 1, and machine tool) (time t5). Since the first task unit identification information "2" stored in the task unit indicator information is only registered in the management data 13b of the robot control device 10, in this case also, the robot control device 10 outputs a notification for executability "1, 2, 100", wherein the work performing element identification information=1, the task unit identification information=2, and the task efficiency=100 (time t6).

Upon receiving this notification for executability, the information processing device 30 outputs an execution command "1, 2" comprising work performing element identification information=1 and task unit identification information=2 (time t7). The robot control device 10 receives this execution command, and executes the operating program 13a-2 corresponding to the task unit identification information=2, thereby causing the robot 1 to carry out the task "Install workpiece in machine tool", whereupon the task unit identification information=2 is deleted, the number of tasks is reduced by 1, and the task unit indicator information "3, 3, 4, 5" is returned (time t8).

The information processing device 30 sends the task unit indicator information "3, 3, 4, 5" thus received out to the control devices 10, 20 of all of the work performing elements (robot 1, machine tool) (time t9). The task unit identification information "3" which is now stored first in the task unit indicator information is registered in the management data 23b of the numerical control device 20, and therefore the numerical control device 20 outputs a notification for executability "2, 3, 100" wherein the work performing element identification information=2, the task unit identification information=3 and the task efficiency=100 (time t10). Upon receiving this notification for executability, the information processing device 30 outputs an execution command "2, 3" comprising the work performing element identification information=2 and the task unit identification information=3, to the numerical control device 20 (time t11). The numerical control device 20 executes the operating program for the task "Process workpiece" which corresponds to the task unit identification information of=3, and it then deletes the task unit identification information=3 corresponding to the task that has been carried out, reduces the number of tasks by 1, and sends the task unit indicator information "2, 4, 5" to the information processing device 30. The information processing device 30 sends this task unit indicator information to the control devices 10, 20 of all of the work performing elements (robot 1, machine tool 2).

Thereafter, similar operations are repeated, the robot 1 executes the operating programs 13a-3 and 13a-4 for the tasks "Remove workpiece from machine tool" and "Place workpiece on temporary workpiece stand" which correspond to the subsequent items of task unit identification information "4" and "5", and the number of tasks in the task unit indicator information thus reaches "0", at which point the information processing device 30 of the production cell ends the work operation for the work command received from the upper-level information processing device 50.

In this way, the information processing device 30 of the production cell receives a work command from a upper-level information processing device 50, and reads out the task unit indicator information corresponding to that work command from the database 33a, whereupon it is simply required to perform processing for resending the information (execution commands, task unit indicator information) received from the respective work performing elements (the robot 1 or machine tool 2). Even in an exceptional case, where notifications for executability are received from two or more work performing elements, it is simply required to determine which element to use on the basis of the task efficiency, and hence the processing load on the information processing device can be reduced in great measure.

Figure 6:
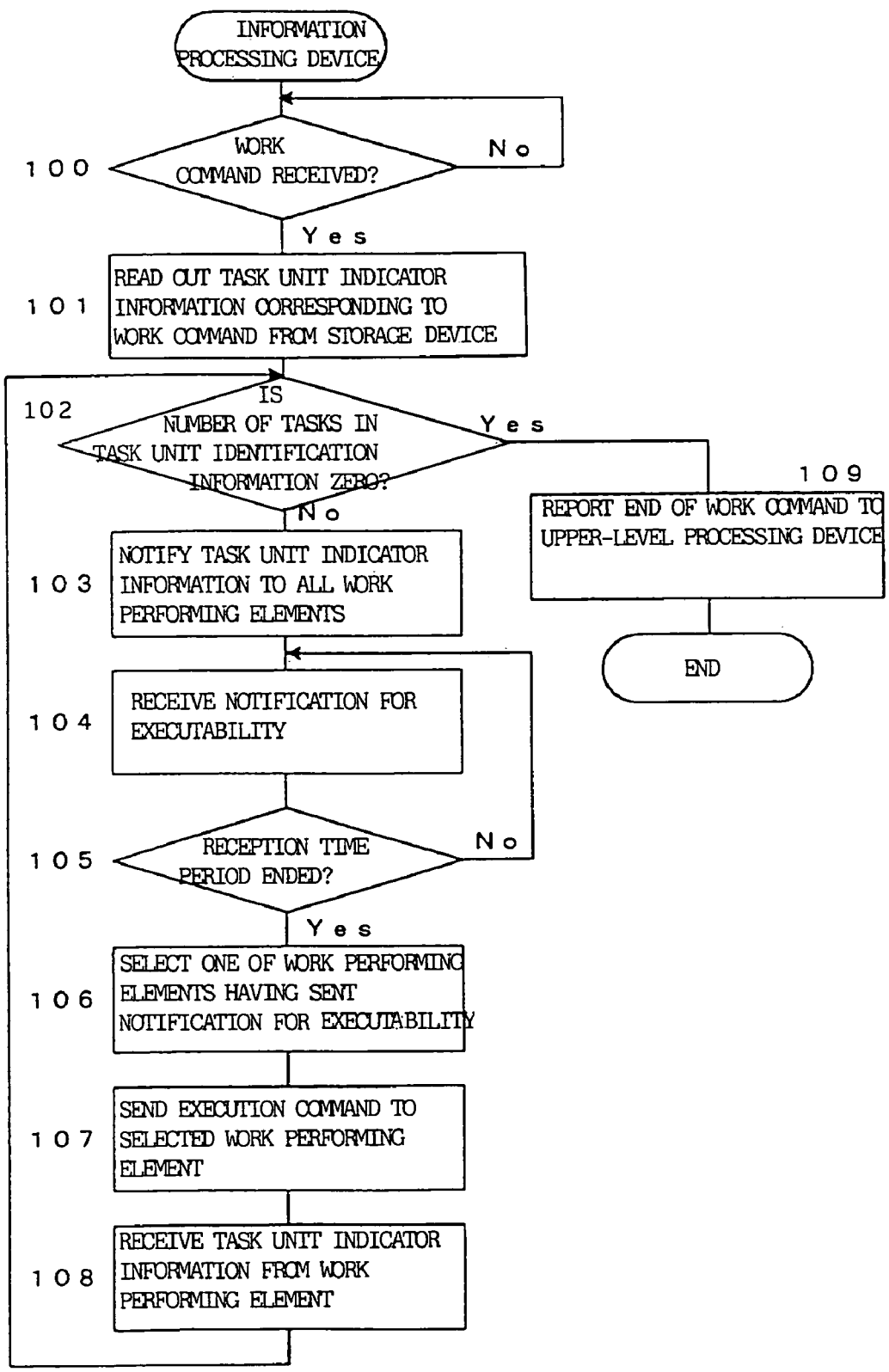
FIG. 6 is a flowchart of processing executed by an information processing device in this embodiment.

FIG. 6 is a flowchart of processing carried out by the processor 31 of the information processing device 30. Moreover, FIG. 7 is a flowchart of processing carried out by the processor of a work performing element (the robot control device 10 of the robot 1 or the numerical control device 20 of the machine tool 2).

The processor 31 of the information processing device 30 determines whether or not it has received a work command from the upper-level information processing device 50 (step 100), and if it has received a work command, then it reads out the task unit indicator information corresponding to the work command thus received, from the database 33a in the storage device 33 (step 101). Thereupon, it determines if the number of tasks stored in the task unit indicator information is "0" (step 102), and since it is not "0" initially, it outputs the task unit indicator information thus read out to all of the work performing elements (the control device 10 of the robot 1 and the numerical control device 20 of the machine tool 2) (step 103). The processor 31 then waits for a notification for executability to be returned, until a prescribed period of time has elapsed (steps 104, 105).

Thereupon, the processor 31 selects one work performing element on the basis of the task efficiency in the received notification for executability (step 106), and outputs an execution command to the work performing element thus selected (step 107). It then waits to receive task unit indicator information from the work performing element to which this execution command was issued (step 108), and when this information is received, it returns to step 102 and executes the processing from step 102 onwards. Thereafter, the processor 31 repeats the processing in step 102 to step 108, until the number of tasks recorded in the task unit indicator information becomes "0". If the number of tasks recorded in the task unit indicator information has reached "0", then the procedure shifts from step 102 to step 109, and the processor 31 sends a notification that the instructed work has been completed, to the upper-level information processing device 50, and then ends the processing corresponding to the work command.

On the other hand, the processors of the respective work performing elements (the control device 10 of the robot 1 and the numerical control device 20 of the machine tool 2) execute the processing shown in FIG. 7.

The processor determines whether or not task unit indicator information has been sent by the information processing device 30 (step 200), and if such information has been sent, it reads out the first task unit identification information stored in the task unit indicator information subsequent to the number of tasks (step 201). It is determined whether or not the task unit identification information thus read out is registered in the management data (13b, 23b) (step 202), and if it is not registered, then processing is ended directly. However, if the information is registered, then the processor determines whether or not the execution in progress flag stored corresponding to the identification information of the task unit thus registered is set to "1" (step 203), and if it is set to "1", and the work of the task unit thus instructed cannot be performed, then processing is ended directly. However, if the execution in progress flag is "0", then a notification for executability is sent to the information processing device 30 (step 204).

The processor awaits an execution command for a prescribed period of time, and if an execution command is not received within that time, then processing is ended (steps 205 to 207). In this case, the information processing device has issued an instruction to another work performing element to carry out the task that the processor had indicated to be executable, and therefore the execution command will not be issued to the work performing element in question. On the other hand, if it does receive an execution command (step 206), then the processor changes the execution in progress flag in the management data (13b, 23b) to "1" (step 208), and sets the execution in progress flags corresponding to the identification information of the excluded tasks stored in correspondence with the identification information of the task unit in question, to "1" also (step 209).

Next, the processor reads out the operating program for the task unit (for example, 13a-1 to 13a-4), on the basis of the link information corresponding to the identification information of that task unit, from the management data (13b, 23b) (step 210), and it executes the relevant operating program, whereby the work performing element is caused to carry out the instructed task (step 211). When the operating program has been executed and the task has been completed, in steps 208 and 209, the execution in progress flags which were previously set to "1" are changed to "0" (steps 212 and 213).

Moreover, the processor reduces the number of tasks in the task unit indicator information originally received by 1, deletes the task unit identification information for the task that has been carried out, thus creating new task unit indicator information (for example, FIG. 4(g1)), (step 214), and then sends this new task unit indicator information to the information processing device 30 (step 215) and returns to step 200. Thereupon, the work performing element repeats the processing described above.

In the embodiment described above, the work performing element determines whether the instructed task unit can be performed or not, and in the case where it can be performed, the work performing element performs it, thereby it is possible to start a next task upon receiving a next work command even during executing a task by a single work command.

In the present embodiment, the processing operation performed by the information processing device 30 which controls the production cell consists of processing for receiving a work command form the upper-level information processing device 50, searching for task unit indicator information from the task unit indicator information database 33a, and sending this information to all of the work performing elements, as well as processing for receiving notifications for executability from the work performing elements, selecting a work performing element on the basis of the task efficiency information, and outputting an execution command, and since, in the case of the present embodiment illustrated in FIG. 1, it only receives one notification for executability, then the operation of selecting the work performing element is extremely straightforward. Moreover, even if two or more work performing elements are able to perform the same task, since it is often the case generally that only one of the work performing elements will not be executing a task (and have the execution in progress flag set to "0"), then the number of notifications for executability received by the information processing device will be few, and in many cases, only one, and hence the burden of selecting the work performing element is small.

Moreover, when the information processing device 30 has received task unit indicator information from a work performing element, it is only required to send the received task unit indicator information to all of the work performing elements, and hence the burden of this processing is also small.

As described above, in the present embodiment, the burden on the information processing device is reduced considerably. On the other hand, if the information processing device has surplus processing capacity, then it is also possible to adopt the following composition.

In the embodiment described above, the information processing device initially sends the task unit indicator information to all of the work performing elements, whereupon the processing for updating the number of tasks and the task unit identification information in the task unit indicator information is carried out by the work performing elements, but this processing may also be carried out by the information processing device.

In this case, the information processing device reads out task unit indicator information from the task unit indicator information database and sends the task unit indicator information or the task unit indicator information of the first task to be executed, to all of the work performing elements, upon which it stores this information, and when it has received a notification for executability and has sent an execution command to a work performing element, it updates the task unit indicator information by reducing the number of tasks in the stored task unit indicator information by 1 and deleting the identification information for the task unit that has been instructed, and upon being notified by the work performing element that the instructed work task has been completed, it sends the new task unit indicator information, or the first task unit identification information therein, to all of the work performing elements. Thereafter, it repeats this processing until the number of tasks stored in the task unit indicator information reaches "0".

Furthermore, in cases where there is only one work performing element for carrying out each respective task unit in the production cell (in the case of the production cell illustrated in FIG. 1), it is possible to do away with the notifications for executability and execution commands, in such a manner that the act of sending the task unit indicator information to the respective work performing elements itself constitutes an execution command. Thereupon, execution completion information (updated task unit indicator information) is received from the work performing element that has carried out the task, and the task unit indicator information forming the execution command for the next task is then sent out to each of the work performing elements. However, if the system of the production cell is constituted in this manner, then a drawback arises in that it becomes difficult to expand or change that system.

By composing the system of a production cell as described in the foregoing embodiment, it becomes possible to expand or change the system of the production cell readily, for instance, by adding work performing elements to the production cell or changing the work performing elements therein, by changing the type of workpiece, or the like, that is processed in the cell, or by changing the working method used, or the like. If a work performing element is added, for example, the work tasks (operating program) to be executed by this work performing element should be stored in the program memory of the added work performing element, and furthermore, management data corresponding to same should also be stored. Moreover, if the working method is to be changed, due to a change in the type of workpiece being processed, or the like, then task unit indicator information for instructing the new work tasks should be added to the task unit indicator information database held in the information processing device. If, in addition to this, task units of the work performing elements are to be changed, then the operating program and corresponding management data for the task unit that is to be changed should be added to the program memory of the work performing element in question.

Furthermore, if there are a plurality of work performing elements which are capable of carrying out the work in a task unit, then in the embodiment described above, it is the information processing device that determines the work performing element which is to carry out that task unit, on the basis of the task efficiency information in the notifications for executability received from the work performing elements, but this decision may also be made by the work performing elements themselves, by means of communication between the respective work performing elements. For example, a method should be adopted wherein a priority order is determined in advance for work performing elements which are able to execute the same task unit, and if a work performing element having a lower priority ranking receives a signal indicating non-executability from a work performing element having a higher priority ranking, and if it is able to execute that task unit, then it executes the task, whereas if the execution in progress flag thereof is set to "1", or the like, and it cannot execute the task unit, then it sends a signal indicating non-executability to a work performing element having a lower priority ranking.

Moreover, it is also possible to cause the work of the next task unit to be carried out, by means of communications between the work performing elements wherein one work performing element sends a signal indicating completion of a task unit to the other work performing elements, when it has completed the work of the task unit in the instructed task unit indicator information. If a method of this kind is adopted, then the simple act of task unit indicator information being sent from the information processing device to all of the work performing elements will constitute a work command. Thereafter, a method should be adopted wherein, by means of communications between the work performing elements, the respective work performing elements successively carry out the task units instructed in the task unit indicator information, in order starting from the first task unit, and when the work in all of the task units has been completed, the work performing element that has carried out the last task, or a predetermined one of the work performing elements, sends a work completed signal to the information processing device.

It is possible to instruct the production cell directly to carry out desired work contents, by freely combining the task units relating to the work performing elements in the production cell, and preparing task unit indicator information accordingly. Moreover, it is also possible freely to increase or decrease the number of work performing elements or the number of task units, in accordance with the production capacity of the production cell, and since a method is adopted which is based on the exchange of the task unit indicator information used, and notifications for executability and execution commands, there is no need at all to change the operating programs which form the task units relating to each respective work performing element.

What is claimed is:

1. A production cell, comprising:
   a plurality of work performing elements for performing work;
   an information processing device for commanding work tasks, connected to the respective work performing elements by communications means, wherein:
   said information processing device outputting a command consisting of a set of task units assigned with an execution sequence, to each of the work performing elements;
   the work performing elements each storing operating programs for respectively executing one or more task units, and performing work by executing the operating programs in the order of the execution sequence, on the basis of the set of task units with an assigned execution sequence output by said information processing device; and
   the information processing device receiving notifications for executability of specific task units from the work performing elements, and based on the received notifications, selecting one of the work performing elements to execute the specific task unit,
   wherein the work performing element notifying the information processing device that execution of one of the task units is possible sends a task efficiency value of the executable task unit, and
   wherein the information processing device selects one of the work performing elements having sent a notification that the task unit is executable and sends an execution command to the selected work performing element, upon which the selected work performing element executes the task unit, based on receipt of the notifications that task units are executable and the task efficiency values from the work performing elements.

2. The production cell according to claim 1, wherein the management of the task unit to be executed next is performed by the information processing device, each time the work in one task unit is completed.

3. The production cell according to claim 1, wherein the management of the task unit to be executed next is performed by communications between the work performing elements, each time the work in one task unit is completed.

4. The production cell according to claim 1, comprising two or more work performing elements capable of performing the work of the same task unit, wherein the work performing element to carry out the work of said same task unit is determined by said information processing device.

5. The production cell according to claim 1, comprising two or more work performing elements capable of performing the work of the same task unit, wherein the work performing element to carry out the work of said same task unit is determined by communications between the work performing elements, in accordance with a previously determined priority order.

6. The production cell according to claim 1, wherein a new work command can be received and work tasks corresponding to said new work command can be executed, while executing work tasks corresponding to another work command already received.

7. The production cell according to claim 1, wherein the types of said work commands are determined by the types of workpiece that are to be processed.

8. A production cell comprising a plurality of work performing elements for performing work, and an information processing device for commanding work tasks, connected to the respective work performing elements by communications means, wherein said information processing device comprises:

means for storing task unit indicator information describing the execution sequence of task units required in order to accomplish the work in question, for each type of work command to be executed in said production cell;

means for receiving a work command and reading out the task unit indicator information corresponding to said received work command, from said storing means;

means for receiving notifications for executability from the respective work performing elements, and sending an execution command to one of the work performing elements having sent said received notifications for executability;

means for receiving task unit indicator information updated and sent back by a work performing element; and means for sending said task unit indicator information read out from said storing means, and the updated task unit indicator information sent back from the work performing element, to each of the work performing elements;

and each of said work performing elements comprises:

task unit storing means for storing one or more task units means for receiving task unit indicator information from said information processing device and determining whether or not it is possible to execute the task unit that is to be executed next, on the basis of said task unit indicator information means for sending said notification for executability to said information processing device if said task unit is determined to be executable;

means for receiving an execution command from said information processing device and executing the instructed task unit; and means for updating said task unit indicator information and sending same to said information processing device, when execution of said task unit has been completed, such that it can be determined that said task unit has been completed on the basis of said received task unit indicator information.

9. The production cell according to claim 8, wherein said means for determining whether a task unit is executable or not determines whether or not it is possible to execute the task unit on the basis of the task units that can be executed by the work performing element, and management data storing whether or not the work in said task unit can be started.

10. A production cell comprising a plurality of work performing elements for performing work, and an information processing device for commanding work tasks, connected to the respective work performing elements by communications means, wherein said information processing device comprises:

means for storing task unit indicator information describing the execution sequence of task units required in order to accomplish the work, for each type of work command to be executed in said production cell;

means for receiving a work command and reading out the task unit indicator information corresponding to said received work command, from said storing means;

means for successively outputting information relating to an execution unit to be executed, to each of the work performing elements, on the basis of the execution sequence in the task unit indicator information read out, directly after said task unit indicator information has been read out and each time an execution completion notification is received; and means for receiving notifications for executability from the respective work performing elements, and sending an execution command to one of the work performing elements having sent said received notifications for executability;

and each of said work performing elements comprises:

task unit storing means for storing one or more task units means for receiving execution unit information from said information processing device and determining whether or not it is possible to execute the task unit of said execution unit information;

means for sending said notification for executability to said information processing device if said task unit is determined to be executable;

means for receiving an execution command from said information processing device and executing the instructed task unit; and means for sending an execution completion notification to said information processing device when the execution of said task unit has been completed.

11. The production cell according to claim 10, wherein said means for determining whether a task unit is executable or not determines whether or not it is possible to execute the task unit on the basis of the task units that can be executed by the work performing element, and management data storing whether or not the work in said task unit can be started.

12. A production system, comprising:

an information processing device outputting a work command as a set of task units; and work performing elements in communication with the information processing device and receiving the work command from the information processing device, each of the work performing elements making a determination as to whether the work performing element can execute a specific one of the task units and sending a notification to the information processing device that the specific task unit is executable if the task unit is executable by the work performing element, wherein the work performing element notifying the information processing device that execution of one of the task units is possible sends a task efficiency value of the executable task unit, and wherein the information processing device selects one of the work performing elements having sent a notification that the task unit is executable to execute the specific task unit and sends an execution command to the selected work performing element, upon which the selected work performing element executes the task unit, based on receipt of the notifications that task units are executable and the task efficiency values from the work performing elements.

* * * * *

UNITED STATES PATENT AND TRADEMARK OFFICE
CERTIFICATE OF CORRECTION

PATENT NO.       : 7,221,983 B2                                  Page 1 of 1
APPLICATION NO.  : 10/720750
DATED            : May 22, 2007
INVENTOR(S)      : Atsushi Watanabe et al.

It is certified that error appears in the above-identified patent and that said Letters Patent is hereby corrected as shown below:

Sheet 4 of 7 (Box c, Referral Numeral c3) FIG. 4, Line 2, change "EFFECIENCY" to --EFFICIENCY--.

Sheet 7 of 7 (Below Referral Numeral 208) FIG. 7, Line 3, change "EXECUTED," to --EXECUTED--.

Sheet 7 of 7 (Referral Numeral 215) FIG 7, Line 3, change "PROCESSINF" to --PROCESSING--.

Sheet 7 of 7 (Below Referral Numeral 208) FIG. 7, between boxes 208 and 210 add referral numeral --209--.

Column 10, Line 35, change "FIG. 4(a)," to --FIGS. 4(a),--.

Column 10, Line 38, change "FIG. 4(c)," to --FIGS. 4(c),--.

Column 13, Line 48, change "information of=3," to --information=3,--.

Column 16, Line 26-27, change "information" to --information,--.

Column 19, Line 27, after "more task units" insert --;--.

Column 19, Line 32, after "information" insert --;--.

Column 20, Line 14, after "more task units" insert --;--.

Signed and Sealed this

Sixth Day of November, 2007

JON W. DUDAS
*Director of the United States Patent and Trademark Office*